United States Patent
Connor et al.

(10) Patent No.: US 10,246,180 B2
(45) Date of Patent: Apr. 2, 2019

(54) COOPERATIVE PERCEPTION AND STATE ESTIMATION FOR VEHICLES WITH COMPROMISED SENSOR SYSTEMS

(71) Applicant: Sikorsky Aircraft Corporation, Stratford, CT (US)

(72) Inventors: Michael Aaron Connor, Bridgeport, CT (US); Christopher Stathis, Hamden, CT (US); Joshua M. Leland, Milford, CT (US); Harshad S. Sane, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 2 days.

(21) Appl. No.: 14/717,765

(22) Filed: May 20, 2015

(65) Prior Publication Data

US 2015/0338850 A1    Nov. 26, 2015

Related U.S. Application Data

(60) Provisional application No. 62/000,668, filed on May 20, 2014.

(51) Int. Cl.
| | |
|---|---|
| *G05D 1/00* | (2006.01) |
| *G05D 1/10* | (2006.01) |
| *B64C 19/00* | (2006.01) |
| *B64C 39/02* | (2006.01) |
| *B64D 45/00* | (2006.01) |

(52) U.S. Cl.
CPC ............ *B64C 19/00* (2013.01); *B64C 39/024* (2013.01); *B64D 45/00* (2013.01); *G05D 1/104* (2013.01); *B64C 2201/143* (2013.01)

(58) Field of Classification Search
None
See application file for complete search history.

(56) References Cited

U.S. PATENT DOCUMENTS

| | | | |
|---|---|---|---|
| 6,081,231 A * | 6/2000 | Evans | G01S 5/0027 342/357.75 |
| 6,941,191 B2 | 9/2005 | Jaeger | |
| 7,599,305 B2 | 10/2009 | Bui | |
| 7,994,902 B2 | 8/2011 | Avery et al. | |
| 8,260,537 B2 | 9/2012 | Breed | |
| 8,577,538 B2 | 11/2013 | Lenser et al. | |
| 2004/0030571 A1 | 2/2004 | Solomon | |
| 2006/0080004 A1* | 4/2006 | Cheok | G01C 15/14 701/1 |
| 2007/0042716 A1 | 2/2007 | Goodall et al. | |
| 2014/0012489 A1 | 1/2014 | Pieper et al. | |

* cited by examiner

*Primary Examiner* — Abby Y Lin
*Assistant Examiner* — Kyung J Kim
(74) *Attorney, Agent, or Firm* — Cantor Colburn LLP

(57) ABSTRACT

A method and system for sharing information between independent agents having a processor and memory having instructions stored thereon that, when executed by the processor, cause the system to receive signals indicative of a fault of a sensor system of a first independent agent; transmit signals indicative of a request for sensor information to a second independent agent; receive signals indicative of state information for the second independent agent in response to the receiving of the request for sensor information; and apply the state information to a navigation system of the first independent agent in response to the receiving of the state information.

15 Claims, 5 Drawing Sheets

COOPERATIVE PERCEPTION AND STATE ESTIMATION FOR VEHICLES WITH COMPROMISED SENSOR SYSTEMS

CROSS-REFERENCE TO RELATED APPLICATIONS

This application claims the benefit of U.S. provisional patent application Ser. No. 62/000,668, filed May 20, 2014, the entire contents of which are incorporated herein by reference.

BACKGROUND

The subject matter disclosed herein relates generally to the field of sensor systems for vehicles and to a method and system for perception and state estimation sharing between vehicles with compromised sensor systems.

DESCRIPTION OF RELATED ART

A means of external perception and state estimation is essential for autonomous or semi-autonomous aircraft to effectively navigate within a new environment. Typically, aircraft perception systems perform functions that an operator of the aircraft would have to perform and provide a pilot with information to reliably operate an aircraft. These perception systems, for example, provide environmental and state information for the aircraft or identify problems during operation. In the event that an autonomous aircraft's local sensors or local perception capability become compromised, it may have insufficient information to reliably operate. Such a circumstance typically results in mission failure, damage to or loss of the aircraft, or presents a collision hazard to the environment. As autonomous vehicles begin to undertake tasks of higher importance and safety-criticality, the reliability requirements for an aircraft's system's critical sensor suite can become impractical for the application or mission. Conventional aircraft with compromised perception systems focus on new allocations of responsibilities among mission members; they do not address cooperative perception sharing between aircraft for mission operation or capability. A cooperative perception and state estimation system for information sharing between aircraft with compromised sensor systems would be well received in the art.

BRIEF SUMMARY

According to an aspect of the invention, a method for sharing information between independent agents, includes receiving signals indicative of a fault of a sensor system of a first independent agent; transmitting signals indicative of a request for sensor information to a second independent agent; receiving signals indicative of state information for the second independent agent in response to the transmitting of the request for sensor information; and applying the state information to a navigation system of the first independent agent in response to the receiving of the state information.

In addition to one or more of the features described above, or as an alternative, further embodiments could include receiving perception information determined by the second independent agent.

In addition to one or more of the features described above, or as an alternative, further embodiments could include receiving estimated environment state information determined about the second independent agent.

In addition to one or more of the features described above, or as an alternative, further embodiments could include receiving signals indicative of a fault in an inertial measurement system, air data sensor, global positioning system, or radio navigation system of the first independent agent.

In addition to one or more of the features described above, or as an alternative, further embodiments could include receiving information that is determined based on measured positioning of the second independent agent relative to the first independent agent in response to receiving of the fault in the inertial measurement system.

In addition to one or more of the features described above, or as an alternative, further embodiments could include receiving estimated state information determined about the first independent agent.

In addition to one or more of the features described above, or as an alternative, further embodiments could include applying the estimated state information to the navigation system of the first independent agent in response to the receiving of the estimated state information.

In addition to one or more of the features described above, or as an alternative, further embodiments could include replacing compromised state information with the received estimated state information.

In addition to one or more of the features described above, or as an alternative, further embodiments could include supplementing the compromised state information with the received estimated state information.

According to another aspect of the invention, a system for sharing information between independent agents, includes a plurality of independent agents; a processor; and memory having instructions stored thereon that, when executed by the processor, cause the system to: receive signals indicative of a fault of a sensor system of a first independent agent; transmit signals indicative of a request for sensor information to a second independent agent; receive signals indicative of state information for the second independent agent in response to the receiving of the request for sensor information; and apply the state information to a navigation system of the first independent agent in response to the receiving of the state information.

In addition to one or more of the features described above, or as an alternative, further embodiments could include a processor that is configured to receive perception information determined by the second independent agent.

In addition to one or more of the features described above, or as an alternative, further embodiments could include a processor that is configured to receive estimated environment state information determined about the second independent agent.

In addition to one or more of the features described above, or as an alternative, further embodiments could include a processor that is configured to receive signals indicative of a fault in the sensor system of the first independent agent.

In addition to one or more of the features described above, or as an alternative, further embodiments could include a processor that is configured to receive information that is determined based on measured positioning of the second independent agent relative to the first independent agent in response to receiving the signals indicative of a fault in the sensor system of the first independent agent.

In addition to one or more of the features described above, or as an alternative, further embodiments could include a processor that is configured to receive estimated state information determined about the first independent agent.

In addition to one or more of the features described above, or as an alternative, further embodiments could include a processor that is configured to apply the received estimated state information to the navigation system of the first independent agent.

In addition to one or more of the features described above, or as an alternative, further embodiments could include a processor that is configured to receive information based on at least one of relative state data of the second independent agent and absolute state data of the second independent agent.

In addition to one or more of the features described above, or as an alternative, further embodiments could include a processor that is configured to determine an estimate of an absolute state of the first independent agent in response to the receiving at least one of the relative state data or the absolute state data.

In addition to one or more of the features described above, or as an alternative, further embodiments could include a processor that is configured to receive an estimate of an absolute state of the first independent agent in response to the receiving at least one of the relative state data or the absolute state data.

In addition to one or more of the features described above, or as an alternative, further embodiments could include a processor that is configured to replace compromised state information with the received estimated state information or supplement the compromised state information with the received estimated state information Technical effects of the invention include enhanced mission capability and reliability through perception and state estimated information shared between independent vehicles. Shared perception information and state estimated information between vehicles results in continued functioning or avoiding complete mission failure in the event that one or more of a vehicle's local sensors becomes compromised during a mission or otherwise.

Other aspects, features and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Embodiments describe a system and method for cooperative perception and state estimation between two or more independent vehicles or agents so that a failure affecting one or more sensor systems in an independent agent is mitigated by the sharing of perception information from one or more remote independent agents. Failures may include state data including data related to positioning systems, communication systems, and navigation systems. Embodiments can include independent agents that employ a distribution of dissimilar perception systems in order to enhance common mode fault detection and isolation capability, further strengthening reliability through cooperative sharing.

Figure 1:
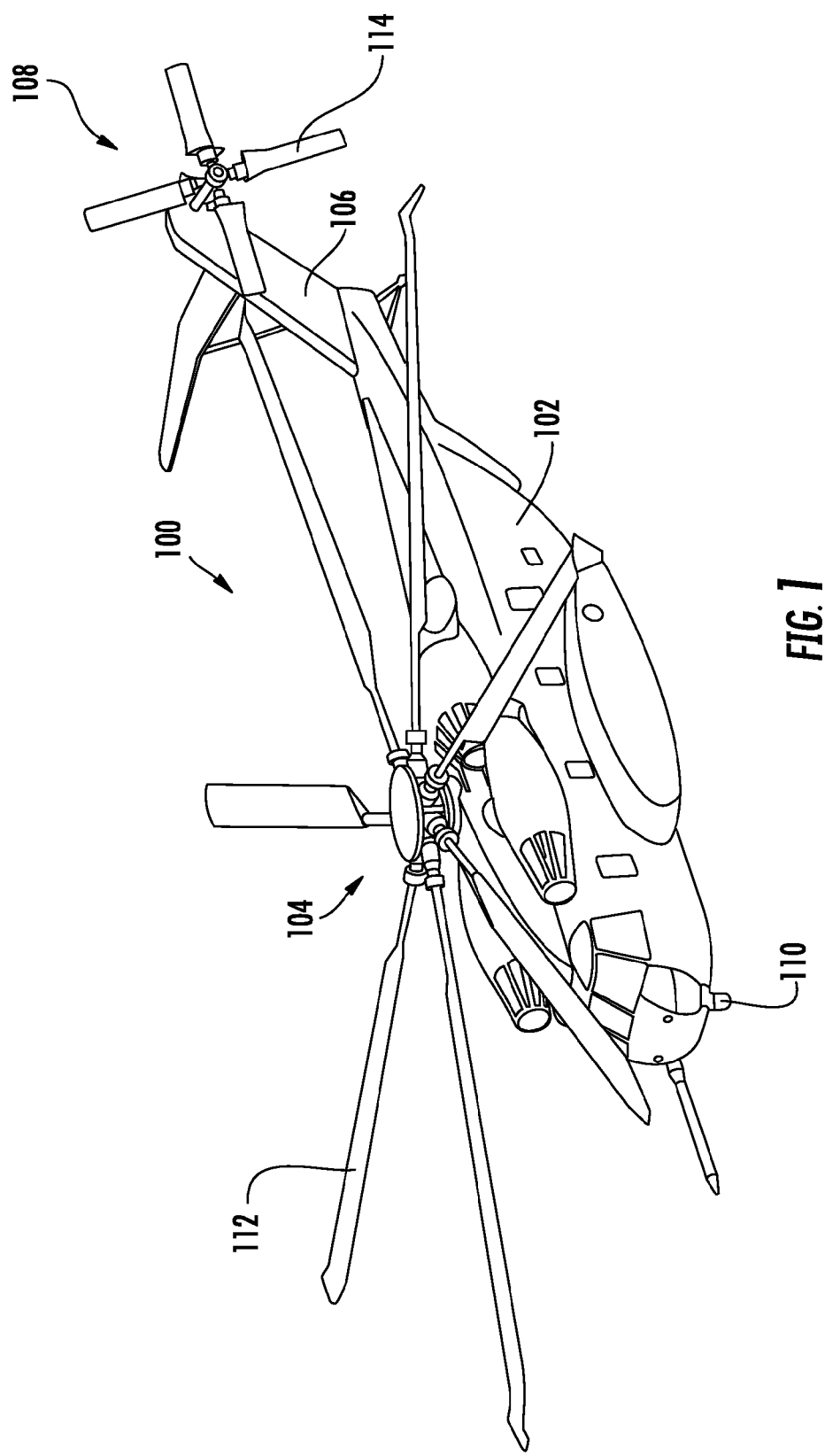
FIG. 1 is a schematic view of an example vehicle according to an embodiment of the invention.

Referring now to the drawings, FIG. 1 illustrates a general perspective view of an exemplary independent agent or vehicle equipped for operation in accordance with embodiments of the invention. The exemplary independent agent is in the form of a vertical takeoff and landing (VTOL) autonomous or semi-autonomous rotary-wing aircraft 100 that implements a cooperative perception and state estimation algorithm 204 (hereinafter "cooperative perception algorithm 204") that is described below with reference to FIGS. 3A-4. Rotary-wing aircraft 100 includes an airframe 102 having a main rotor assembly 104 and an extending tail 106 which mounts an anti-torque system, such as a tail rotor assembly 108. Main rotor assembly 104 includes a plurality of substantially similar rotor blades 112 while tail rotor assembly 108 includes a plurality of substantially similar blades 114.

Also, aircraft 100 can include a sensor system 110 that is attached to airframe 102. Sensor system 110 can include sensors associated with one or more devices for receiving state information or data for aircraft 100. In embodiments, sensor system 110 includes sensors for receiving information related to perception, inertial, GPS, air data, radio navigation, and other vehicle state sensors. Aircraft 100 includes cooperative perception algorithm 204 (FIG. 2) stored in memory for determining and communicating perception and state estimation information between two or more independent agents or vehicles. In an embodiment, perception data is shared with an independent agent or vehicle that has a compromised perception system. For purposes of describing the invention, the term "independent agent" is intended to refer to any vehicle such as, for example, aircraft 100 that cooperates with one or more independent agents to undertake tasks and/or navigate within an environment in support of a mission, and the term "state information or data" is intended to refer to navigational data related to position or location or motion of a vehicle either absolutely (in an inertial reference frame), relative to the air (with reference to air data), or relative to the ground (with reference to perception data). Although a particular vehicle in the form of a rotary-wing aircraft 100 is illustrated and described in the disclosed embodiments, it will be appreciated that other configurations and/or machines include autonomous and optionally piloted vehicles that may operate in land or water including fixed-wing aircraft, rotary-wing aircraft, marine vessels (e.g., submarines, ships, etc.), and land vehicles (e.g., trucks, cars, etc.) may also benefit from embodiments disclosed. As such, embodiments of the disclosed invention are not restricted to application in aircraft, but are applicable wherever communication of perception and state information between independent agents is desired.

Figure 2:
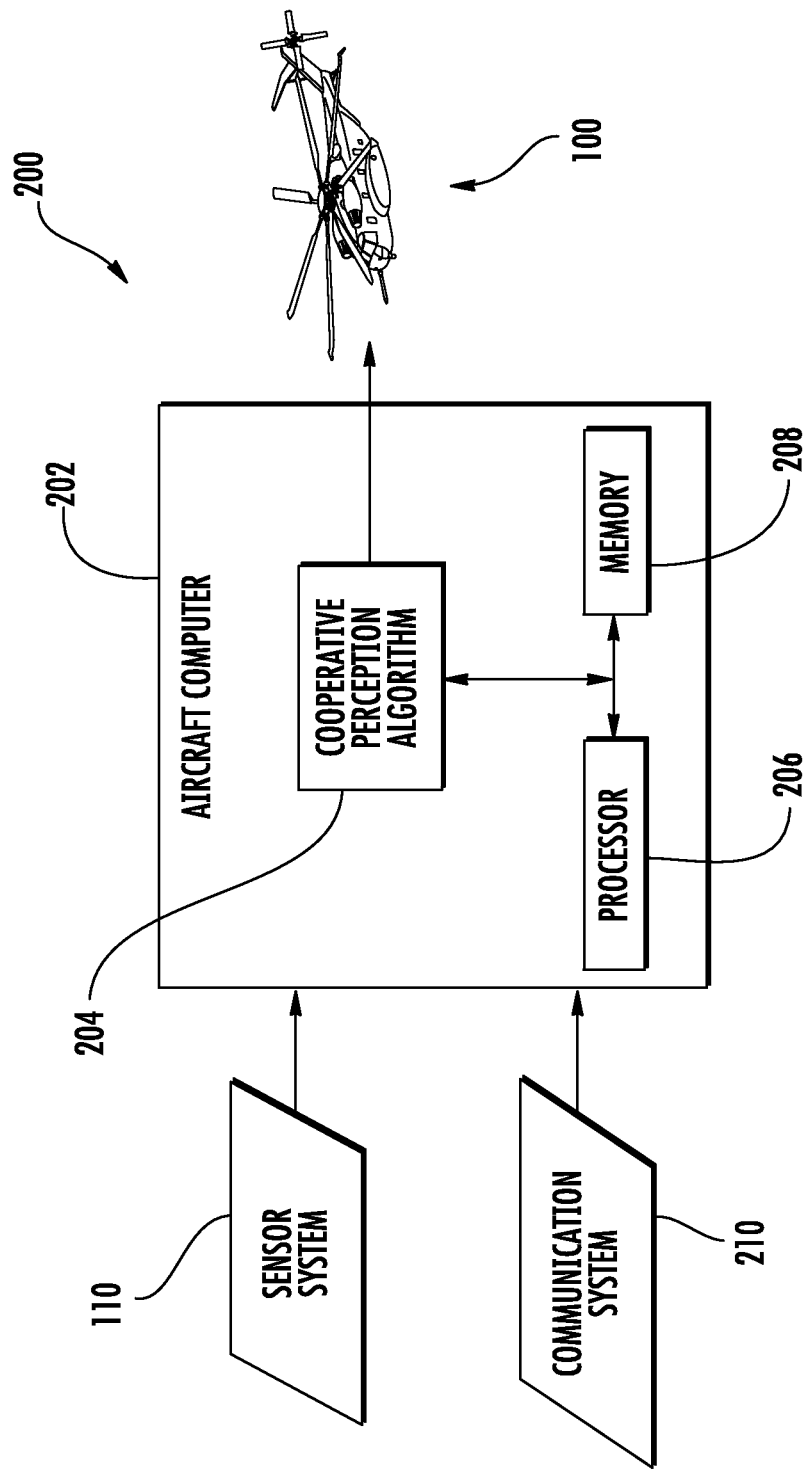
FIG. 2 is a schematic view of an example computing system according to an embodiment of the invention.

FIG. 2 illustrates a schematic block diagram of a control system 200 (for aircraft 100) according to an exemplary embodiment. As illustrated, control system 200 implements a cooperative perception algorithm 204 for cooperative perception and state estimation between two or more independent agents with a compromised perception system. Control system 200 includes a computing system such as an aircraft computer 202 having one or more processors and memory to process sensor data acquired from perception system 110. Aircraft computer 202 includes a memory 208. Memory 208 stores cooperative perception algorithm 204 as executable instructions that is executed by processor 206. The instructions may be stored or organized in any manner and at any level of abstraction, such as in connection with the execution of cooperative perception algorithm 204. Processor 206 may be any type of processor (CPU), including a general purpose processor, a digital signal processor, a microcontroller, an application specific integrated circuit, a field programmable gate array or the like. Also, in embodiments, memory 208 may include random access memory (RAM), read only memory (ROM), or other electronic, optical, magnetic or any other computer readable medium onto which is stored cooperative perception algorithm 204 described below with reference to FIGS. 3A-4.

Sensor system 110 includes sensors associated with one or more acquisition devices for capturing state information or position information for aircraft 100. In embodiments, sensor system 110 can be a navigation system such as, for example, a Global Positioning System (GPS), an Inertial Measurement unit (IMU), or other inertial measurement system such as air data sensors or radio navigation systems that can be used to acquire positional data related to a current location and acceleration of aircraft 100 and can be used to determine a geographic location of aircraft 100 including a change from the initial position of aircraft 100, sensors associated with a vision system such as cameras, LIght Detection and Ranging scanner (LIDAR), LAser Detection and Ranging scanner (LADAR), and radio communications such as air data scanner, instrument landing system (ILS) and radio navigation, or the like.

FIGS. 3A-3D illustrate schematic views depicting cooperative communication between independent agents 302 and 304 for identification of a sensor system fault and sharing of perception information, state information or data, or environment state data between independent agents 302 and 304 according to an embodiment of the invention. In embodiments, cooperative communication between independent agents 302, 304 can include autonomous vehicles, unpiloted vehicles, or assistive cooperation between piloted vehicles. In an embodiment, a perception system fault in independent agent 302 can include a fault in camera navigation which compromises its ability to determine its location with respect to its surroundings or terrain or a vehicle fault in its inertial measurement system such as, for example, a sensor fault in its Inertial Measurement Unit, GPS system, or the like which compromises its ability to maintain stability and/or determine its position, location, or relative motion.

Figure 3A:
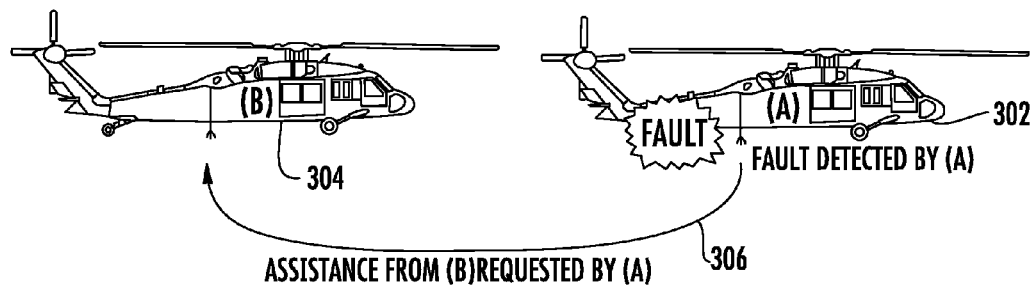
FIG. 3A is a schematic view depicting self-identification of a fault within an independent agent according to an embodiment of the invention.

In an embodiment, as illustrated in FIG. 3A, independent agent 302 may determine the presence of a fault within its sensor system through self-identification. For example, sensor system within independent agent 302 can self-identify a fault by detecting a failure or degradation of its local state data and is, therefore, unable to maintain stability or basic navigation. In this instance, independent agent 302 may communicate a request for perception assistance from independent agent 304, either automatically or manually through pilot intervention, over communication link 306.

Figure 3B:
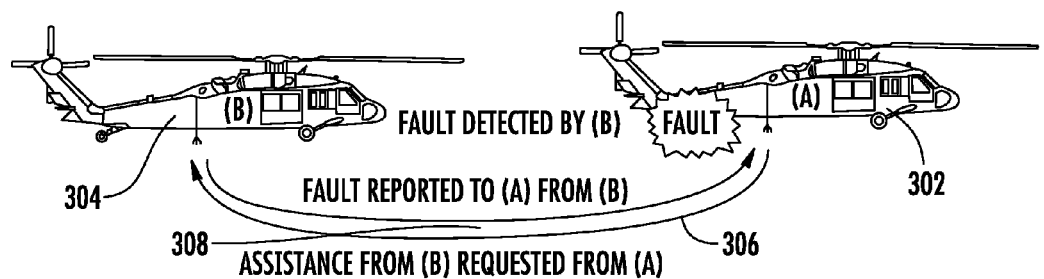
FIG. 3B is a schematic view depicting notification of a fault from another independent agent according to an embodiment of the invention.

In an embodiment, as illustrated in FIG. 3B, independent agent 302 may be notified of a fault within its sensor system from independent agent 304. For example, independent agent 302 may have a latent fault with, for example, a navigation system that caused it to deviate from a planned route and is not aware of this deviation. However, independent agent 304 with its perception sensors may determine that independent agent 304 has deviated from its planned route and can notify independent agent 302 of this deviation over communication link 308. In response, independent agent 302 may communicate a request for perception assistance from independent agent 304, either automatically or manually through pilot intervention, over communication link 306.

Figure 3C:
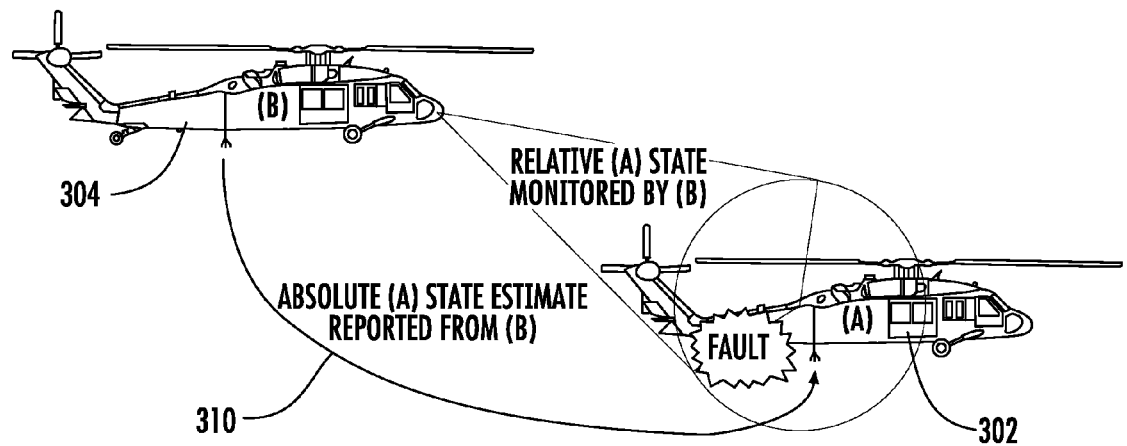
FIG. 3C is a schematic view depicting cooperative perception information and state estimation between independent agents according to an embodiment of the invention.

In an embodiment, as illustrated in FIG. 3C, in response to receiving a request for perception assistance from independent agent 302, independent agent 304, in an embodiment, can collect perception information through its perception sensors and provide this collected information back to independent agent 302 over communication link 310. In another embodiment, independent agents 302,304 can assume positions such that perception sensors of independent agent 304 can collect information about relative position and motion state of independent agent 302. Independent agent 304 can calculate state estimates for independent agent 302 from the information regarding relative position and communicate this state estimate information back to independent agent 302 over communication link 310.

Figure 3D:
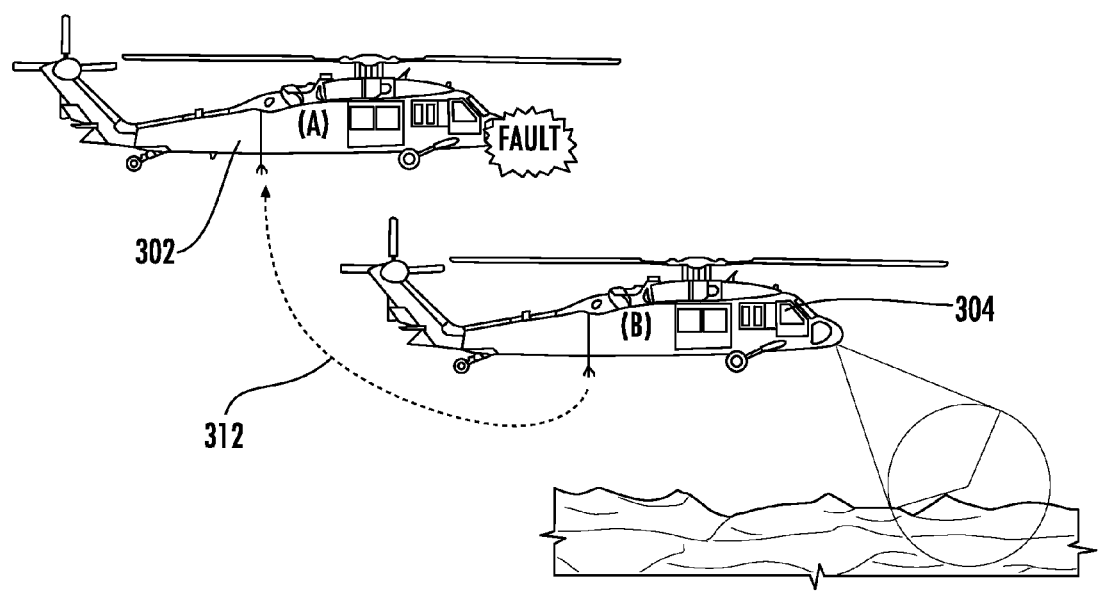
FIG. 3D is a schematic view depicting cooperative environment state estimate information sharing between independent agents according to an embodiment of the invention.

In an embodiment, as illustrated in FIG. 3D, independent agent 302 may determine that a fault exists within its sensor system through self-identification or notification from independent agent 304 and is unable to collect environment state information from its surroundings. Environment state information can include information of surroundings around independent agent 304, such as, e.g., terrain related information. In this instance, independent agent 304 can monitor environment state information and communicate this environment state estimate information back to independent agent 302 periodically over communication link 312 so that independent agent 302 can navigate with the estimated state environment information.

Figure 4:
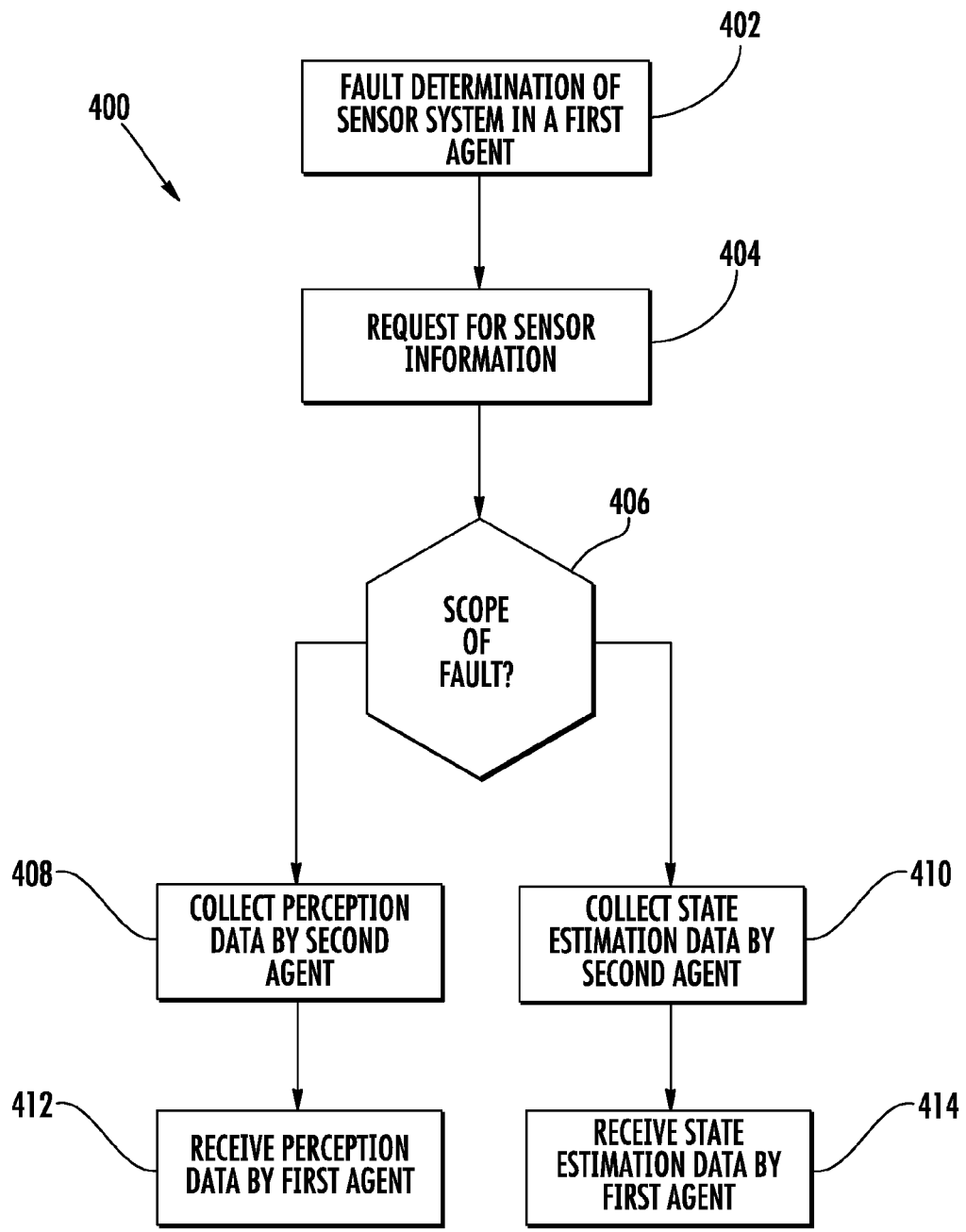
FIG. 4 is a flow chart or method for implementing a cooperative perception algorithm according to an embodiment of the invention.

FIG. 4 is a flow chart for an exemplary process 400 for perception information and state estimation sharing between two or more independent agents according to an embodiment of the invention. The exemplary process 400 depicts implementation of cooperative perception algorithm 204 (FIG. 2) that is executed by processor 206 for sharing perception and state estimated information between independent agents 302 and 304. As such, FIGS. 2 and 3A-3C are also being referenced in the description of the exemplary process of FIG. 4.

The process 400 begins at 402 where processor 206 (FIG. 2) receives information related to a fault within a sensor system of independent agent 302. In embodiments, processor 206 may receive information related to a fault within its sensor system based on self-identification by independent agent 302 or through notification/communication of a fault from independent agent 304. A sensor system can include: a navigation system such as, for example, a Global Positioning System (GPS), an Inertial Measurement unit (IMU), or other inertial measurement system such as air data sensors or radio navigation systems that can be used to acquire positional data related to a current location and acceleration of aircraft 100 and can be used to determine a geographic location of aircraft 100 including a change from the initial position of aircraft 100 or sensors associated with a vision system such as cameras, LIght Detection and Ranging scanner (LIDAR), LAser Detection and Ranging scanner (LADAR), and radio communications such as air data scanner, instrument landing system (ILS) and radio navigation, or the like.

In an embodiment, independent agent 302 may self-identify a fault by detecting a failure or degradation of its local state data, which can compromise its stability or basic navigation. Independent agent may determine that a sensor is not functioning from built-in-test of a sensor associated with a sensor system or through another system level test that is performed to determine degradation in local state data. In another embodiment, independent agent 302 may self-identify a fault in its inertial sensors such as LIDAR, LADAR or GPS. For example, independent agent 302 may lose functioning of its GPS which compromises it ability to determine its location.

Independent agent 302 may also be notified of a fault from independent agent 304. For example, independent agent 302 may have a latent fault with a navigation system that causes it to deviate from a planned route and is not aware of this deviation. However, independent agent 304 with its perception sensors may determine that independent agent 304 may have deviated from its planned route and can notify independent agent 302 of a potential deviation over communication link 308. At 404, independent agent 302 may communicate a request for assistance with sensor information from independent agent 304, either automatically or manually through pilot intervention, over communication link 306 if independent agent 302 ascertains that it has a compromised perception system affecting its stability, navigation, or deviation from a planned route.

At 406, if independent agent 302 determines that it has a fault with its perception system such as, for example, a vision system associated with a camera or LIDAR, and it may not know where the terrain is around it, then at 408, independent agent 304 can use its perception system to collect perception information on independent agent 304. This collected perception information can relate directly to a fault with the perception system of independent agent 302 such as, surroundings around independent agent 304 including terrain related information. At 412, independent agent 304 can transmit its collected perception information over communication link 310 to independent agent 302 for implementation by aircraft computer of independent agent 302. Independent agent 302 may, thus, operate cooperatively with independent agent 304 by receiving perception data for implementation onboard independent agent 302 until independent agent 302 no longer requires perception assistance.

However, at 406, if independent agent 302 determines that it has a fault with its own inertial navigation system such as, for example, sensors associated with a GPS system is not functioning that caused independent agent 302 to have a degradation in its local state data, then at 410, independent agent 304 will assume a position in relation to independent agent 302 such that perception system of independent agent 304 can collect information about the relative position and motion state of independent agent 302. In embodiments, independent agent 304 can use its airspeed and relative position of independent agents 302 and 304 with respect to each other to determine absolute state estimates for independent agent 302. In an embodiment, independent agent 304 can determine its own relative state data and absolute state data. At 414, independent agent 304 can transmit absolute state estimated information to independent agent 302 over communication link 310. In an embodiment, independent agent 304 can transmit relative state estimated information to independent agent 302, which is used by independent agent 302 to determine an absolute state of the first independent agent 302. The received state estimated information can be applied by aircraft computer of independent agent 302 in place of compromised sensor data or to supplement the compromised sensor data in its perception system. Independent agent 302 may, thus, operate cooperatively with independent agent 304 by receiving perception data for implementation onboard independent agent 302 until independent agent 302 no longer requires state estimation information and/or perception assistance.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for sharing information between independent agents, comprising:
    receiving, with a processor, signals indicative of a fault of a sensor system of a first independent agent, wherein the fault is identified by the first independent agent;
    transmitting, with the processor, signals indicative of a request for sensor information to a second independent agent in response to receiving said signals indicative of the fault of the sensor system;
    positioning the second independent agent relative to the first independent agent such that a sensor system of the second independent agent can collect information about a relative position and a motion state of the first independent agent;
    calculating state information for the first independent agent from the relative position and motion state information collected;
    receiving, with the processor, signals indicative of the state information in response to the transmitting of the request for sensor information;
    applying, with the processor, the state information to a navigation system of the first independent agent in response to the receiving of the state information; and
    operating the first independent agent using the state information provided by the second independent agent.

2. The method of claim 1, wherein the receiving of the state information further comprises receiving perception information determined by the second independent agent.

3. The method of claim 1, further comprising receiving estimated environment state information determined about the second independent agent.

4. The method of claim 1, wherein the local state data includes an inertial measurement system, air data sensor, global positioning system, or radio navigation system of the first independent agent.

5. The method of claim 4, further comprising receiving information that is determined based on measured positioning of the second independent agent relative to the first independent agent in response to receiving of the fault in the inertial measurement system.

6. The method of claim 1, further comprising receiving estimated state information determined about the first independent agent.

7. The method of claim 6, further comprising applying the estimated state information to the navigation system of the first independent agent in response to the receiving of the estimated state information.

8. The method of claim 6, further comprising one of replacing compromised state information with the received estimated state information or supplementing the compromised state information with the received estimated state information.

9. A system for sharing information between independent agents, comprising
   a processor; and
   memory having instructions stored thereon that, when executed by the processor, cause the system to:
   receive signals indicative of a fault of a sensor system of a first independent agent, wherein the first independent agent is operable to identify faults of the sensor system;
   transmit signals indicative of a request for sensor information to a second independent agent in response to said signals indicative of the fault of the sensor system;
   positioning the second independent agent relative to the first independent agent such that a sensor system of the second independent agent can collect information about a relative position and a motion state of the first independent agent;
   calculating state information for the first independent agent from the relative position and motion state information collected;
   receive signals indicative of the state information in response to the receiving of the request for sensor information;
   apply the state information for the second independent agent to a navigation system of the first independent agent in response to the receiving of the state information; and
   operate the first independent agent using the state information provided by the second independent agent.

10. The system of claim 9, wherein the processor is configured to receive perception information determined by the second independent agent.

11. The system of claim 9, wherein the processor is configured to receive estimated environment state information determined about the second independent agent.

12. The system of claim 10, wherein the processor is configured to receive information that is determined based on measured positioning of the second independent agent relative to the first independent agent in response to receiving the signals indicative of a fault in the sensor system of the first independent agent.

13. The system of claim 9, wherein the processor is configured to receive estimated state information determined about the first independent agent.

14. The system of claim 9, wherein the processor is configured to receive information based on at least one of relative state data of the second independent agent and absolute state data of the second independent agent.

15. The system of claim 14, wherein the processor is configured to determine an estimate of an absolute state of the first independent agent in response to the receiving at least one of the relative state data or the absolute state data.

* * * * *